United States Patent [19]

Peucker

[11] Patent Number: 5,044,088
[45] Date of Patent: Sep. 3, 1991

[54] CONCENTRICITY MEASURING DEVICE

[75] Inventor: Fritz A. Peucker, Branford, Conn.

[73] Assignee: Megacentric, Inc., Branford, Conn.

[21] Appl. No.: 561,133

[22] Filed: Aug. 1, 1990

[51] Int. Cl.⁵ .............................................. G01B 5/20
[52] U.S. Cl. .................................... 33/550; 33/555.3;
33/568; 33/573
[58] Field of Search ................ 33/532, 550, 549, 551,
33/568, 569, 570, 573, 55.3

[56]  References Cited
U.S. PATENT DOCUMENTS

| 1,401,119 | 12/1921 | Aloeborgh | 33/555.3 |
| 2,408,672 | 10/1946 | Mennesson | 33/555.3 |
| 2,489,597 | 11/1949 | Swanson | 33/550 |
| 2,572,999 | 10/1951 | Elliott | 33/555.3 |
| 2,603,043 | 7/1952 | Bontemps | 33/555.3 |
| 3,328,885 | 7/1967 | Frindel | 33/551 |
| 4,064,633 | 12/1977 | Wertepny | 33/550 |
| 4,596,076 | 6/1986 | Sigg | 33/573 |
| 4,601,110 | 7/1986 | Donaldson | 33/573 |

FOREIGN PATENT DOCUMENTS 0903523 10/1945 France .................................. 33/550
0571668 9/1945 United Kingdom .................. 33/550

OTHER PUBLICATIONS

American Machinist-Special Report No. 467-Dec. 1, 1958, pp. 109-113.

Primary Examiner—Thomas B. Will
Attorney, Agent, or Firm—St. Onge, Steward, Johnston & Reens

[57]  ABSTRACT

The invention provides an improved device for checking the concentricity of a cylindrical workpiece. The device comprises replaceable pin members detachably mounted in parallel V-shaped supporting members, the upper surfaces of the pin members forming linear contact with the workpiece under test. When the workpiece contacting surface of a pin member becomes worn the pin is either rotated or replaced by a new one to provide a virigin linear surface for contact with a workpiece. One of the V-shaped supports is slidably mounted to provide for lateral movement with respect to the other. V-shaped supoprts having different included angles can be employed to accommodate testing of centerless ground parts having multiple lobes.

12 Claims, 4 Drawing Sheets

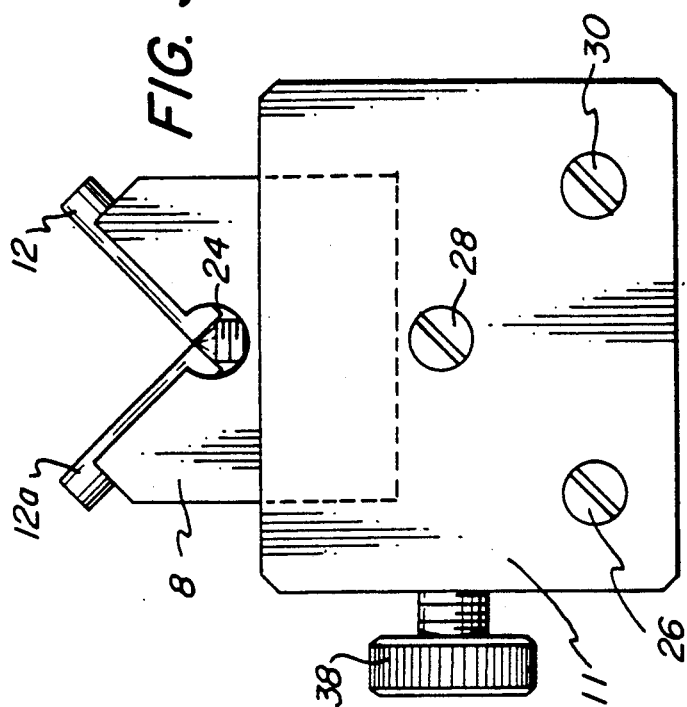
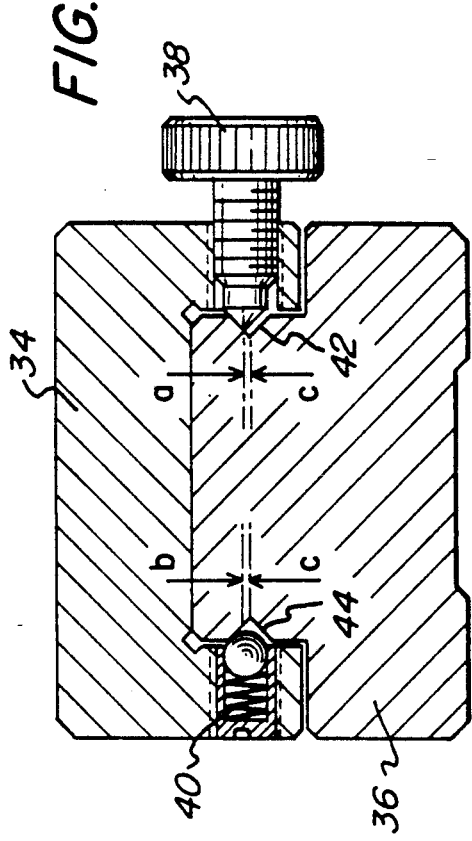
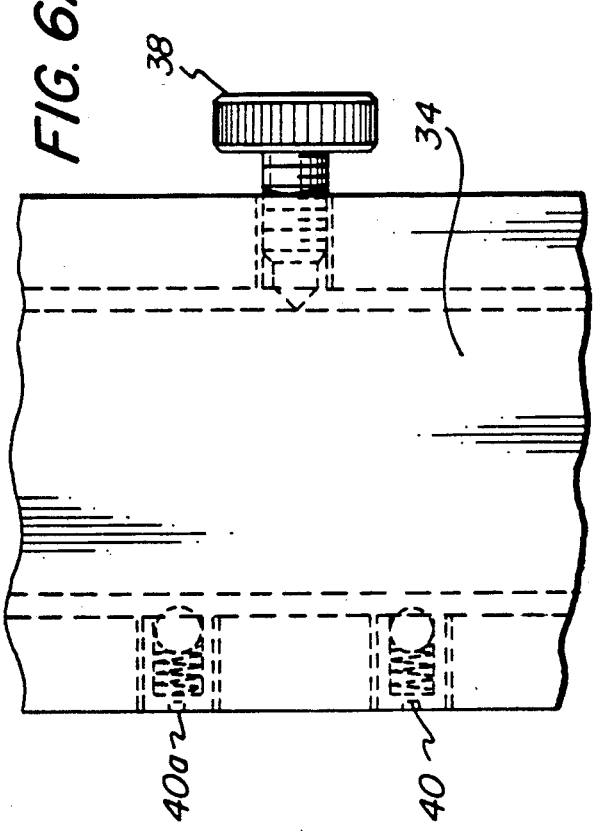

CONCENTRICITY MEASURING DEVICE

BACKGROUND OF THE INVENTION

This invention is concerned with measuring devices and is more particularly concerned with an improved device for measuring the concentricity of a cylindrical or like configured workpiece.

It has long been the practice to employ a solid V-block to test the concentricity of cylindrical machined workpieces. The surfaces of such V-blocks suffer wear marks over a period of time due to friction between the block surface and the workpieces being tested. This is not a significant problem so long as the workpieces being tested are always of the same diameter. However, if the same block is being used to test a variety of workpieces having different diameters the wear patterns on the block could distort the accuracy of the measurement. To correct such a situation the V-block has to be reground, an operation which is time-consuming and costly, or replaced in its entirety. Further, the standard solid V-block has a longitudinal relief groove which is necessary to permit grinding of the V-surface. The presence of this groove prohibits the testing of workpieces having very small diameters of the order of about 0.125 inches or less.

The above disadvantages in solid V-blocks are well-recognized in the art but few attempts to them have been reported. Aldeborgh U.S. Pat. No. 1,401,119 shows a device for measuring the diameter of a workpiece rather than determining the concentricity thereof. The device includes a V-shaped body for receiving the workpiece. The walls of the V-shaped body are provided with replaceable wear plates. Mennesson U.S. Pat. No. 2,408,672 also shows a similar device with replaceable wear plates in the V-shaped member for receiving a workpiece.

Swanson U.S. Pat. No. 2,489,597 shows a device for determining the concentricity of a cylindrical workpiece having a plurality of outside and inside diameters. The supporting surfaces for receiving the workpiece are formed by the edges of replaceable blades. When wear of the edges occurs the blades need to be removed and reground or replaced.

Frindel U.S. Pat. No. 3,328,885 shows a V-block having pins welded to the surface thereof to form the surfaces for contacting a workpiece. The V-block forms part of a device which employs optical means for checking the linear profile of a workpiece.

In accordance with the present invention it has been found that the disadvantages associated with V-blocks hitherto available can be overcome in a simple but elegant manner which will now be discussed in detail.

SUMMARY OF THE INVENTION

It is an object of the invention to provide an improved V-block for determining the concentricity of a cylindrical or like linear workpiece. It is a further object of the invention to provide a V-block in which linearity of surfaces contacting the workpiece can be readily and simply maintained. It is yet another object of the invention to provide a V-block which can be employed to determine concentricity of cylindrical workpieces having an outside diameter as low as 0.02 inches. It is a still further object of the invention too provide a V-block which can be employed to determine the roundness of centerless ground workpieces having multiple lobe configurations.

These objects, and other objects which will become apparent from the description which follows, are achieved by the device of the present invention. The latter, in its broadest aspect, comprises a device for determining the concentricity of an elongated workpiece wherein first and second V-shaped supports are mounted in symmetrical horizontal alignment and spaced apart from each other on a table. Pin members are detachably mounted in channels traversing each arm of the crotches of the V-shaped supports. Each pin member has a longitudinal surface projecting above and substantially parallel to the surface of the arm in which it is mounted, the exposed surface of the pin members in each V-shaped support together forming a V which provides linear contact with a workpiece whose concentricity is to be determined.

In a particular and preferred embodiment of the device of the invention the first V-shaped support is mounted rigidly on the table and the second V-shaped support is slidably mounted on the table to provide relative lateral movement with respect to the first support. The pin members, in a preferred embodiment, are cylindrical and identical in size and configuration and are rotatably mounted in the channels of the V-shaped support crotches.

As will be obvious to one skilled in the art, the device of the invention presents a number of advantages over similar devices hitherto available in the art. Thus, once a surface of the pin making contact with the workpiece shows signs of wear, the pin can be rotated in its mounting channel to expose a virgin linear surface for contact with the workpiece. This process of rotation can be repeated as necessary until no more virgin surfaces are available at which point the pin is simply removed and replaced by a new pin. Further, as will become apparent from the description which follows, the V formed by the exposed surfaces of the pins in each of the first and second V-shaped support members permits workpieces having very small diameters, as low as at least 0.03 inches, to be tested. In addition, the V-shaped support members are readily detachable. Those members in which the included angle in the V-shaped crotch is 90°, as is normally the case for testing cylindrical workpieces, can be replaced by members having different angularities (as will be discussed below) to test centerless parts having 3-lobe, 5-lobe and 7-lobe configurations. Further advantages of the device of the invention will become apparent from the description which follows.

BRIEF DESCRIPTION OF THE DRAWINGS

FIG. 3 is a side elevation view of the rear of the device as shown in the rendering in FIG. 1.

FIG. 6 is a cross-sectional view taken along the line 6—6 in FIG. 1.

FIG. 6A is a plan view of a portion of the device shown in FIG. 1.

FIG. 7 is a cross-sectional view taken along the line 7—7 in FIG. 1.

DETAILED DESCRIPTION OF THE INVENTION

The invention will now be described further with reference to the accompanying drawings.

Figure 1:
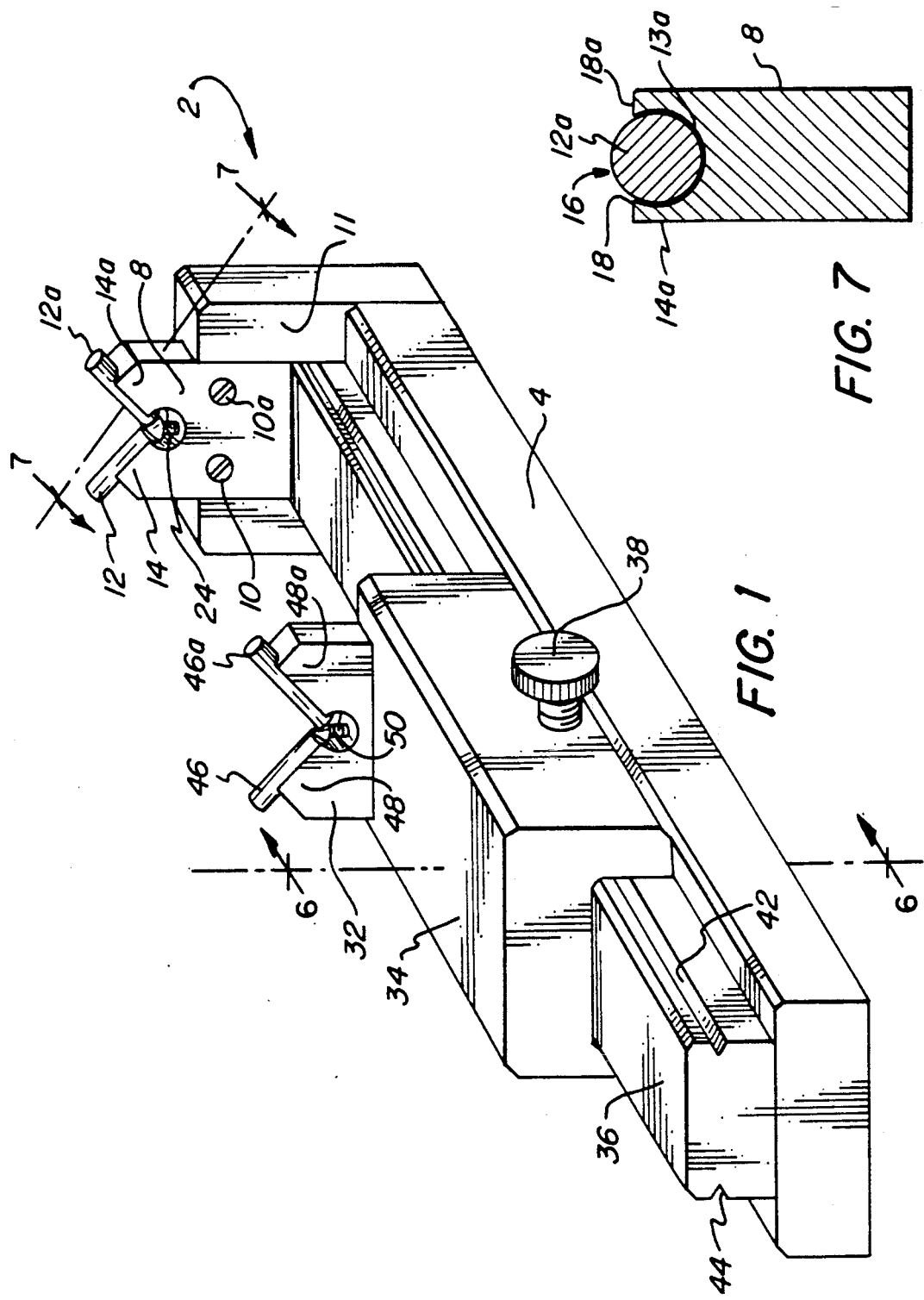
FIG. 1 is a perspective view of a device in accordance with the invention.

A typical embodiment of a device of the invention is shown overall, in perspective, as (2) in FIG. 1. Table (4) has end-plate (11) on which is mounted in an appropriate recess in a first V-shaped support member (8) held in place by bolts (10) and (10a). Cylindrical pins (12) and (12a) are detachably and rotatably mounted in channels (13) and (13a) in the upper surfaces of the arms (14) and (14a) of the V-shaped crotch of the support (8).

FIG. 7, which is a cross-sectional view taken along line 7—7 in FIG. 1, shows in more detail the manner in which the pin (12a) is mounted in channel (13a) in the arm (14a). The cross sectional configuration of channel (13a) is that of a circle with a portion of the upper quadrant missing. The upper inner edges (18) and (18a) lap around the periphery of pin (12a) and leave exposed a portion (16) of the upper periphery of pin (12a). In a less preferred embodiment there is sufficient clearance between the periphery of pin (12a) and the inner surface of channel (13a) to permit manual rotation and/or removal of the pin (12a). However, in a preferred embodiment, the clearance is very small, of the order of 0.0001 inches and the pins cannot be rotated by hand or removed manually. A pin-vise is required to remove the pins in this embodiment and rotation of the pin, if required, is carried out with the pin removed from the channel. Pin (12) is mounted in identical manner in channel (13) in the other arm (14) of the crotch of V-shaped support (8).

Figure 5:
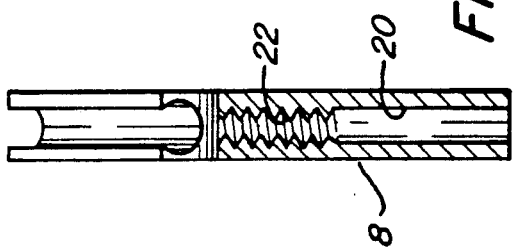
FIG. 5 is a cross-sectional view taken along the line 5—5 in FIG. 4.
Figure 4:
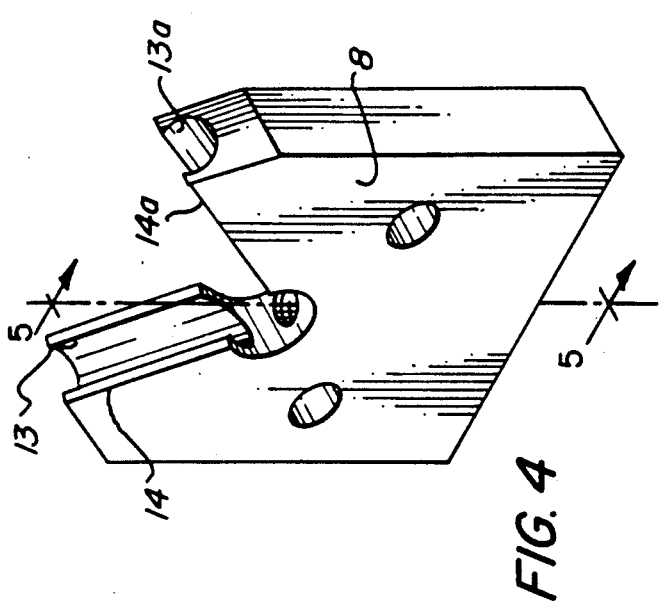
FIG. 4 is a perspective view of one of the V-shaped supports of the device of the invention shown in FIG. 1.

FIG. 4 shows a perspective view of support member (8) detached from the device shown in FIG. 1 and with pins (12) and (12a) and bolts (10) and (10a) removed. In FIG. 5, a cross-sectional view taken along lines 5—5 vertically through the center of the member (8) in FIG. 4, there is shown cylindrical passage (20) which leads to threaded passage (22) into which is inserted an appropriately threaded support screw (24) the upper tip of which (shown in FIGS. 1 and 3) engages the lower ends of pins (12) and (12a) and serves to support them in the desired configuration.

FIG. 3 shows the reverse side of end plate (11) and V-support member (8). Bolts (26), (28) and (30) secure end-plate (11) to the end of table (4).

Referring again to FIG. 1, a second V-shaped support (32) which advantageously is identical in size and configuration to that of first support (8) is mounted vertically in an appropriate recess on block (34) so that the V-shaped crotches in both support members (8) and (32) are in symmetrical horizontal alignment. Block (34) is slidably mounted on guide member (36) and is secured in position at any predetermined position by the combined action of locking screw (38) the inner tip of which engages lateral groove (42) in the side of guide member (36) and spring-loaded ball plungers (40) and (40a) on the opposite side of guide member (36) which plungers engage groove (44). The mode of interaction of locking screw (38), plungers (40) and (40a) shown in dotted lines and grooves (42) and (44) is shown further in FIG. 6 which is a vertical cross-sectional view taken along lines 6—6 in FIG. 1 and in FIG. 6A which is a plan view of block (34). In a preferred embodiment shown in FIG. 6, the centerline (a) of screw (38) and the centerline (b) of ball plunger (40) are each offset above the centerline (c) of grooves (42) and (44). The offset, which is of the order of about 0.01 to 0.015 inches, serves to pull block (34) downwardly on guide member (36) as screw (38) is tightened.

Pins (46) and (46a) are rotatably and detachably mounted in channels in the arms (48) and (48a) of the crotch of the second V-shaped support (32) in exactly the same manner as the corresponding pins (12) and (12a) are mounted in the first V-shaped support (8) as described above and shown in detail in FIG. 7. The pins (46) and (46a) are supported in the desired position by means of support screw (50) which is mounted in support (32) in the same manner as support screw (24) in support (8).

Figure 2:
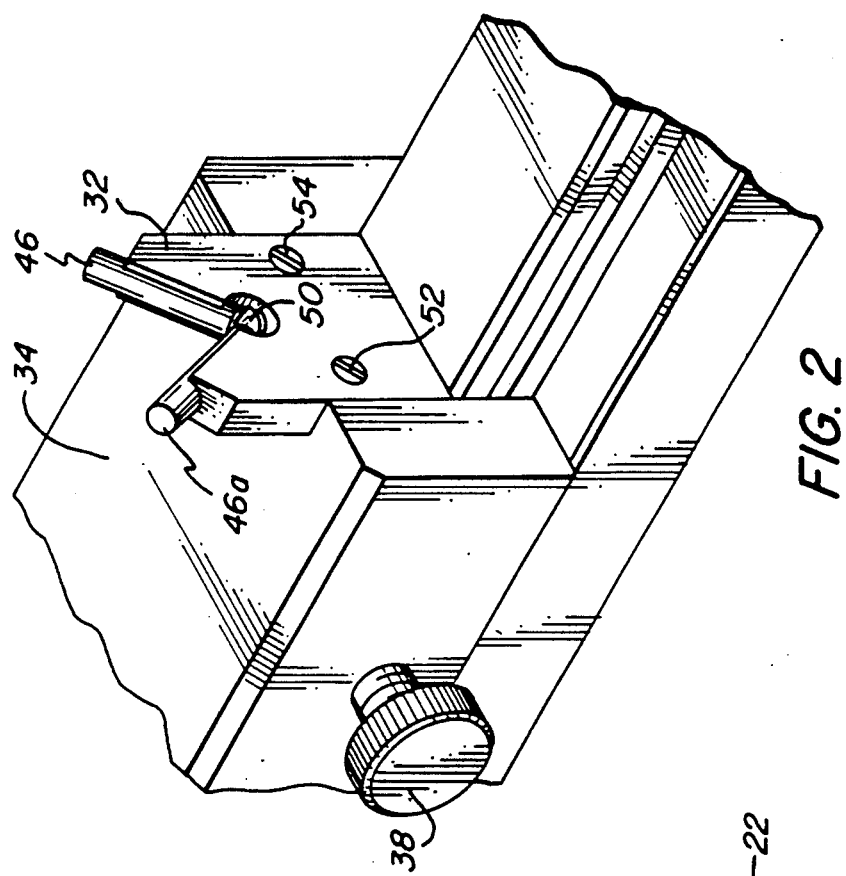
FIG. 2 is another view in partial perspective of the device shown in FIG. 1.

FIG. 2 shows, in partial perspective, a view of the opposite side of second V-shaped support (32) to that shown in FIG. 1. Support (32) is mounted in a recess in the end of block (34) and held in place on said block by bolts (52) and (54).

Pins (12), (12a), (46) and (46a) are preferably identical in size and configuration and, in a preferred embodiment, are fabricated from hardened steel, carbide, ceramic and the like and ground and polished to the desired configuration. As will be seen from FIG. 1, the exposed surfaces of these four pins serve to provide linear contact with a cylindrical workpiece whose concentricity is to be tested. Once the contact surface of any of the pins shows signs of wear, a virgin surface free of wear can be exposed by rotating the pin through an appropriate amount. When this procedure has been repeated a number of times and no further virgin surface is available the pin is removed and replaced by a new one with unblemished surface.

It will also be seen from any of FIGS. 1, 2 and 3 that the exposed contact surfaces of pins (12) and (12a) and those of the pins (46) and (46a) each meet directly at their lowermost extremities and leave no gap in the apex of the V which is formed by each pair of pins. It is this feature of the device of the invention which permits the device to be used to check the concentricity of workpieces having a diameter at least as low as 0.03 inches.

Figure 8A:
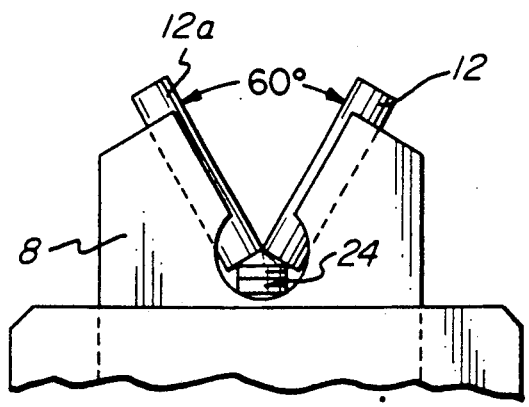
FIGS. 8A, 8B and 8C show in partial views a modification of the device shown in FIG. 3.
Figure 8B:
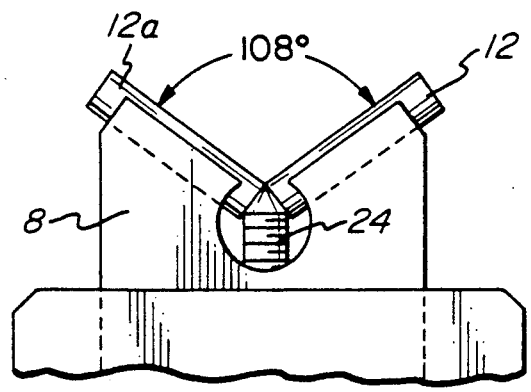
Figure 8C:
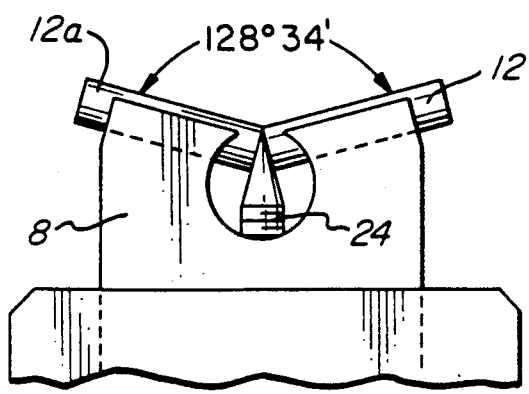

The angle enclosed by the V's formed by the contact surfaces of the above pairs of pins is substantially 90° since this is the generally accepted configuration employed in testing concentricity of cylindrical workpieces. However, it is to be understood that the device of the invention is not limited to such a configuration in the angle described by the V's. Thus, the device can also be employed to test the roundness of cylindrical centerless workpieces having 3-lobe, 5-lobe or 7-lobe configurations. In order to accommodate such workpieces the two V-shaped support members (8) and (32) shown in the embodiments described above are removed and replaced by pairs of V-shaped supports in which the enclosed angle is 60° for testing 3-lobe centerless ground parts (FIG. 8A), 108° for testing 5-lobe centerless ground parts (FIG. 8B), or 128° 34 minutes for testing 7-lobe centerless ground parts (FIG. 8C). Accordingly, it will be seen that the device of the invention is readily adaptable for use in testing a wide variety of workpieces.

It is to be understood that the embodiment of the invention discussed above and shown in the appended drawings has been given for purposes of exemplification only and is not to be construed as limiting the scope of the present invention. As will be obvious to one skilled in the art a variety of modifications of the above embodiment can be made without departing from the scope of this invention. Illustratively, while the use of cylindrical pins (12), (12a), (46) and (46a) in the above device is a preferred embodiment, this particular configuration is not critical and the pins could have square, hexagonal and like cross-sectional configurations with appropriate corresponding changes in the cross-sectional configuration of the channels in which the pins are mounted. In the case of such cross-sections in the pins, the latter would be withdrawn, rotated by the desired amount, and reinserted in the channels in order to expose a virgin contact surface.

In yet another possible modification of the device shown in the exemplifying embodiment, the second V-shaped support need not be made capable of lateral movement but could be rigidly mounted on table (4) at any desired distance from the first V-shaped support. Other such modifications and variations which can be made without departing from the scope of the invention will be readily apparent to one skilled in the art. The scope is limited only by the claims which are appended hereto.

I claim:

1. A device for supporting a workpiece comprising, in combination:
   a table;
   a first V-shaped support member mounted on said table;
   a second V-shaped support member mounted on said table in symmetrical linear alignment with said first V-shaped support and spaced apart therefrom; and
   pin members detachably mounted in channels traversing the surface of each arm of the crotches of said first and second V-shaped supports, said pin members each extending into the apex of the V in the V-shaped support in which they are mounted and having a portion of their longitudinal surfaces projecting above and parallel to the surface of said arm in which they are mounted so as to provide linear contact with a workpiece whose concentricity or roundness is to be determined.

2. A device according to claim 1 wherein said second V-shaped support is slidably mounted on said table for lateral movement with respect to said first V-shaped support.

3. A device according to claim 1 wherein said pin members are cylindrical and identical in size and configuration.

4. A device according to claim 3 wherein each of said channels has a cross-section which is circular minus a portion of one quadrant, and has an inside diameter slightly in excess of the outside diameter of said pins.

5. A device according to claim 3 wherein the included angle formed by the longitudinal axes of said pins mounted in the crotches of each of said first and second V-shaped supports is 90°.

6. A device according to claim 3 wherein the included angle formed by the longitudinal axes of said pins mounted in the crotches of each of said first and second V-shaped supports is 60°.

7. A device according to claim 3 wherein the included angle formed by the longitudinal axes of said pins mounted in the crotches of each of said first and second V-shaped supports is 108°.

8. A device according to claim 3 wherein the included angle formed by the longitudinal axes of said pins mounted in the crotches of each of said first and second V-shaped supports is 128° and 34 minutes.

9. A device for supporting a workpiece comprising, in combination:
   a table;
   a first V-shaped support mounted vertically on said table;
   a second V-shaped support slidably mounted vertically on said table and adapted to be moved laterally with respect to said first V-shaped support in symmetrical linear alignment therewith; and
   cylindrical pin members detachably mounted in surface channels having a depth less than the diameter of said pin members in each side of the crotches of said first and second V-shaped members, the longitudinal axes of the said pin members in the sides of one crotch forming a V which is linearly aligned with respect to that formed by the said pin members in the sides of the other crotch, each of said pin members extending into the apex of the V in the V-shaped member in which they are mounted.

10. A device according to claim 9 which also comprises locking means for retaining said second V-shaped support at a predetermined distance from said first V-shaped support.

11. A device according to claim 9 which also comprises means for supporting said pins in predetermined position in said channels.

12. A device according to claim 9 wherein said channels have a cross-section which is circular but minus a portion of one quadrant.

* * * * *